US012636923B2

(12) United States Patent
Kang et al.

(10) Patent No.: US 12,636,923 B2
(45) Date of Patent: May 26, 2026

(54) SUSPENSION INSULATOR

(71) Applicants:HYUNDAI MOBIS CO., LTD., Seoul (KR); PYUNG HWA INDUSTRIAL CO., LTD., Daegu (KR)

(72) Inventors: Jae Hee Kang, Yongin-si (KR); Sung Jin Won, Yongin-si (KR); Ho Sung Lee, Daegu (KR); Do Hyung Kim, Daegu (KR)

(73) Assignees: HYUNDAI MOBIS CO., LTD., Seoul (KR); PYUNG HWA INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 18/663,764

(22) Filed: May 14, 2024

(65) Prior Publication Data

US 2025/0074127 A1     Mar. 6, 2025

(30) Foreign Application Priority Data

Aug. 31, 2023     (KR) ........................ 10-2023-0115345

(51) Int. Cl.
B60G 13/00          (2006.01)

(52) U.S. Cl.
CPC .... B60G 13/005 (2013.01); B60G 2204/4106 (2013.01); B60G 2204/43 (2013.01)

(58) Field of Classification Search
CPC .......... B60G 13/005; B60G 2204/4106; B60G 2204/43; B60G 2204/128; B60G 2204/41;

B60G 2204/41062; B60G 2206/013; B60G 15/068; B60G 13/033; B60G 15/067; F16F 13/1463; F16F 9/54; F16F 13/14

See application file for complete search history.

(56) References Cited

U.S. PATENT DOCUMENTS

| | | | | |
|---|---|---|---|---|
| 5,005,810 | A * | 4/1991 | Sawada .................... | B60G 7/02 277/645 |
| 5,165,669 | A * | 11/1992 | Mayerbock ............. | F16F 13/24 267/219 |
| 2007/0102855 | A1* | 5/2007 | Wirges .................... | F16F 13/28 267/141.1 |
| 2019/0186585 | A1* | 6/2019 | Akiyama ............. | B60G 15/067 |
| 2021/0291604 | A1* | 9/2021 | Jo .......................... | F16F 1/3732 |
| 2022/0090624 | A1* | 3/2022 | Song .................... | F16C 33/102 |
| 2023/0332667 | A1* | 10/2023 | Ryu .................... | F16F 13/1463 |
| 2023/0356553 | A1* | 11/2023 | Won .......................... | F16F 1/30 |
| 2024/0198749 | A1* | 6/2024 | Kim .................... | B60G 13/003 |
| 2025/0074127 | A1* | 3/2025 | Kang .................... | B60G 13/003 |

FOREIGN PATENT DOCUMENTS

KR          10-0180370 B     3/1999

* cited by examiner

*Primary Examiner* — Karen Beck
(74) *Attorney, Agent, or Firm* — NovoTechIP International PLLC

(57)          ABSTRACT
A suspension insulator includes a bracket section configured to be coupled to a vehicle body, an inner core positioned inside the bracket section, a bushing module surrounding the inner core and having a passage part which contains a fluid, an outer pipe surrounding the bushing module, and an upper section coupled to the bracket section and configured to cover the bushing module.

7 Claims, 12 Drawing Sheets

SUSPENSION INSULATOR

CROSS-REFERENCE TO RELATED APPLICATIONS

This application claims priority from and the benefit of Korean Patent Application No. 10-2023-0115345, filed on Aug. 31, 2023, which is hereby incorporated by reference for all purposes as if set forth herein.

TECHNICAL FIELD

Exemplary embodiments of the present disclosure relate to a suspension insulator, and more particularly, to a suspension insulator capable of enhancing vehicle ride comfort by simultaneously improving NVH and R&H performance.

BACKGROUND

In general, a vehicle suspension is a device that connects an axle to a body of a vehicle and prevents direct transmission of vibration or shock from the road surface via the wheels of the vehicle to the vehicle body while the vehicle is traveling, thereby preventing damage to the vehicle body and providing better ride comfort.

In the vehicle suspension, an insulator is installed on the top of a piston rod for coupling to the vehicle body. The insulator has a bushing with a damping function.

However, it may be difficult for the bushing to improve both NVH (Noise, Vibration, and Harshness) and R&H (Ride & Handling) performance due to the characteristics thereof. Therefore, there is a need to address such an issue.

SUMMARY

Various embodiments are directed to a suspension insulator capable of enhancing vehicle ride comfort by simultaneously improving NVH and R&H performance.

In an embodiment, there is provided a suspension insulator that includes a bracket section configured to be coupled to a vehicle body, an inner core positioned inside the bracket section, a bushing module surrounding the inner core and having a passage part which contains a fluid, an outer pipe surrounding the bushing module, and an upper section coupled to the bracket section and configured to cover the bushing module.

The bushing module may include a bushing coupled to the inner core and having a fluid storage part defining a fluid storage portion that contains the fluid, the bushing being made of an elastic material that enables elastic deformation of the bushing during movement of the inner core. The passage part defines a passage that is fluidly coupled to the fluid storage portion such that the passage is supplied with the fluid from the fluid storage part in response to elastic deformation of the bushing (and the fluid storage part).

The bushing module may further include a stiffness reinforcement part configured to reinforce a stiffness of the bushing.

The bushing may include an elastic deformation induction part configured to induce elastic deformation of the bushing.

The fluid storage part may include a first fluid storage portion fluidly connected to one end of the passage, and a second fluid storage portion fluidly connected to the other end of the passage, the second fluid storage portion being spaced apart from the first fluid storage portion.

One of the first and second fluid storage portions may be reduced in volume when the bushing is elastically deformed which causes at least a portion of the fluid therein to flow to the other of the first and second fluid storage portion via the passage and cause the volume of this fluid storage portion to expand.

The passage may include a first fluid hole connected to the first fluid storage portion, a second fluid hole connected to the second fluid storage portion, and a passage groove configured to connect the first fluid hole and the second fluid hole, the fluid passing through the passage groove.

The passage groove may have a spiral shape.

As apparent from the above description, the suspension insulator according to the present disclosure can simultaneously improve NVH and R&H performance through the elastic characteristics of the bushing and the damping characteristics due to flow of fluid as the bushing module has the passage part for pass of fluid therethrough, thereby increasing vehicle performance and enhancing vehicle ride comfort.

BRIEF DESCRIPTION OF THE DRAWINGS

Figure 2:
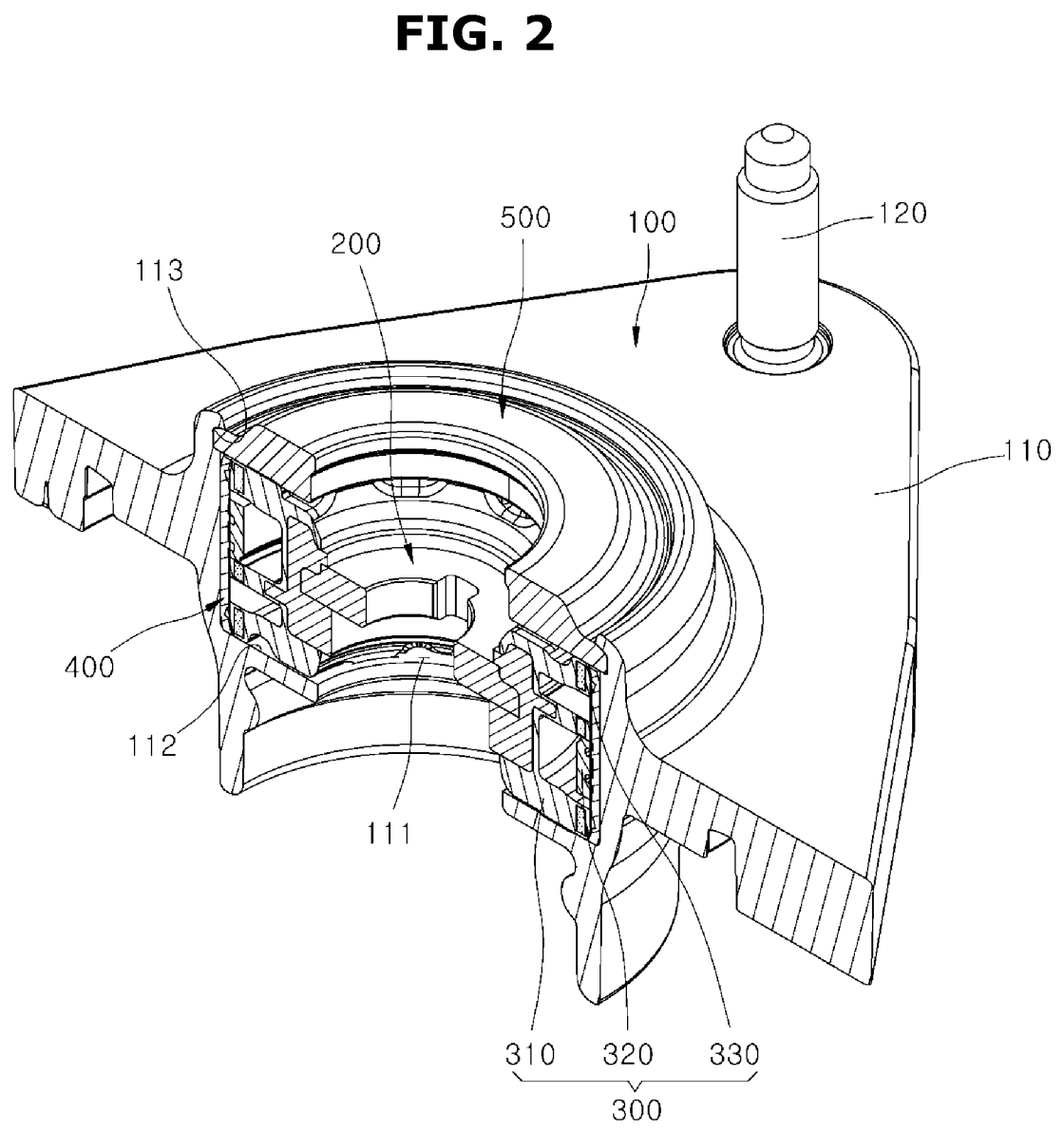

FIG. 2 is a cross-sectional perspective view taken along line A-A' of FIG. 1.

Figure 5:
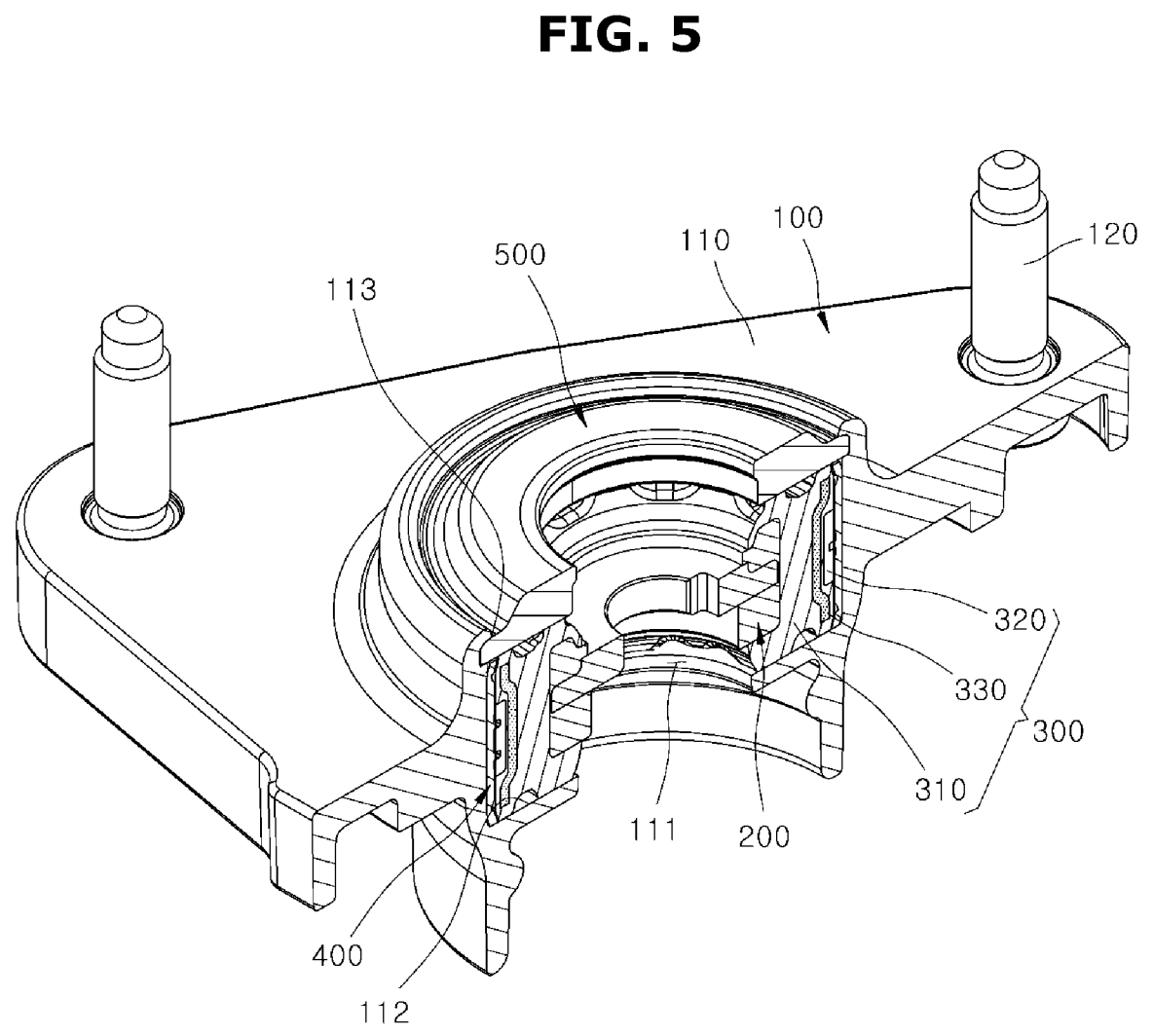

FIG. 5 is a cross-sectional perspective view taken along line B-B' of FIG. 1.

Figure 7:
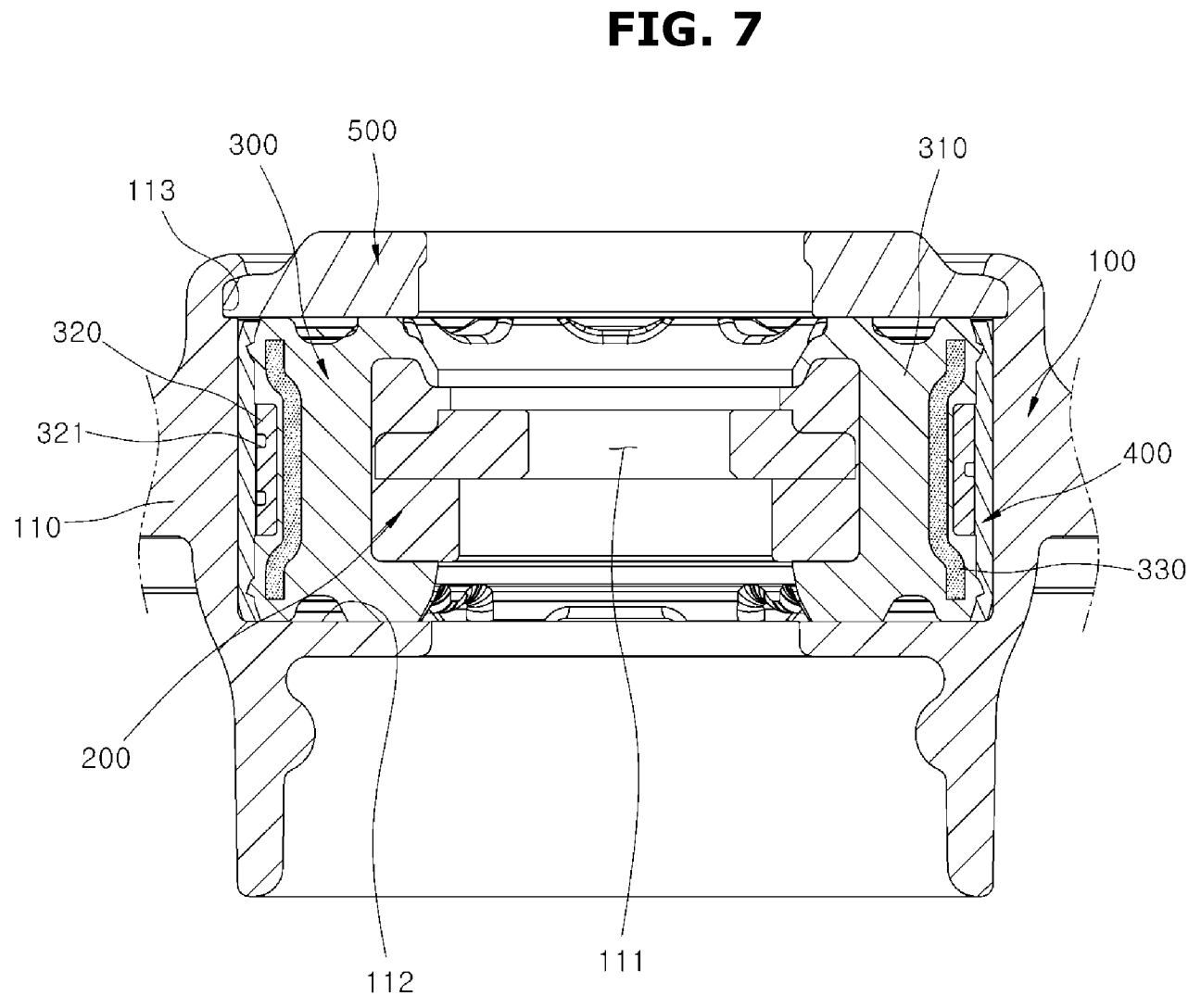

FIG. 7 is an enlarged view of the main part of FIG. 6.

DETAILED DESCRIPTION

Figure 1:
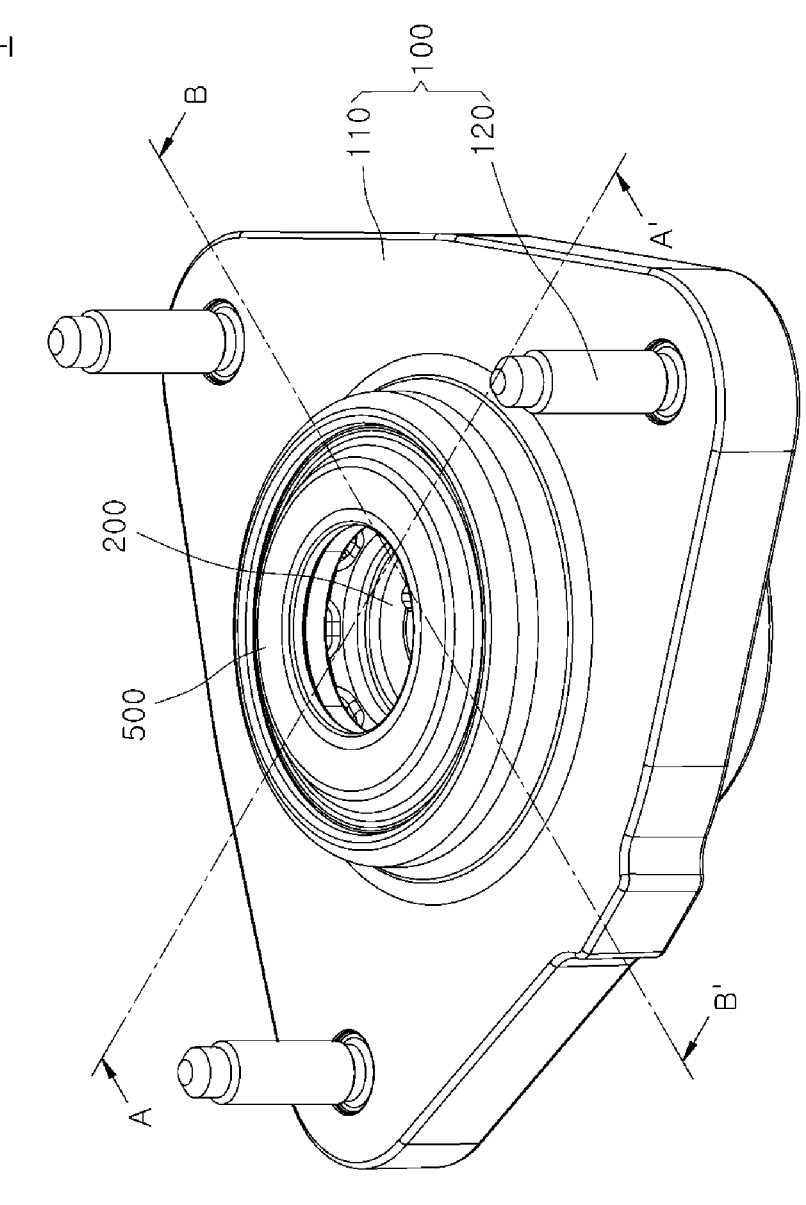
FIG. 1 is a view illustrating a suspension insulator according to an embodiment of the present disclosure.

Hereinafter, a suspension insulator according to embodiments of the present disclosure will be described with reference to the accompanying drawings.

It should be considered that the thickness of each line or the size of each component in the drawings may be exaggeratedly illustrated for clarity and convenience of description. In addition, the terms used herein are terms defined in consideration of functions of the present disclosure, and these terms may change depending on the intention or practice of a user or an operator. Therefore, these terms should be defined based on the entirety of the disclosure set forth herein.

Figure 3:
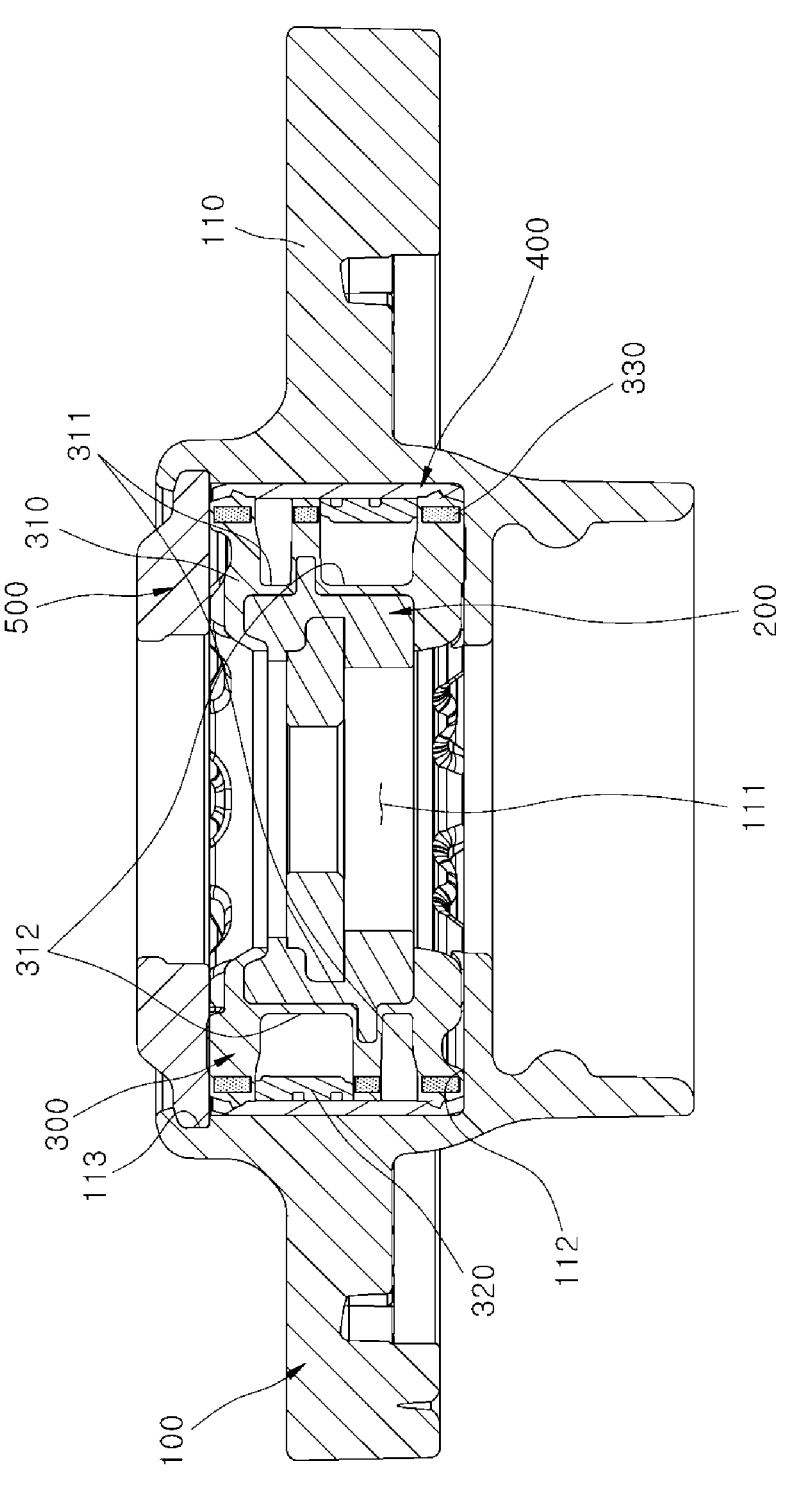
FIG. 3 is a cross-sectional view of FIG. 2.
Figure 4:
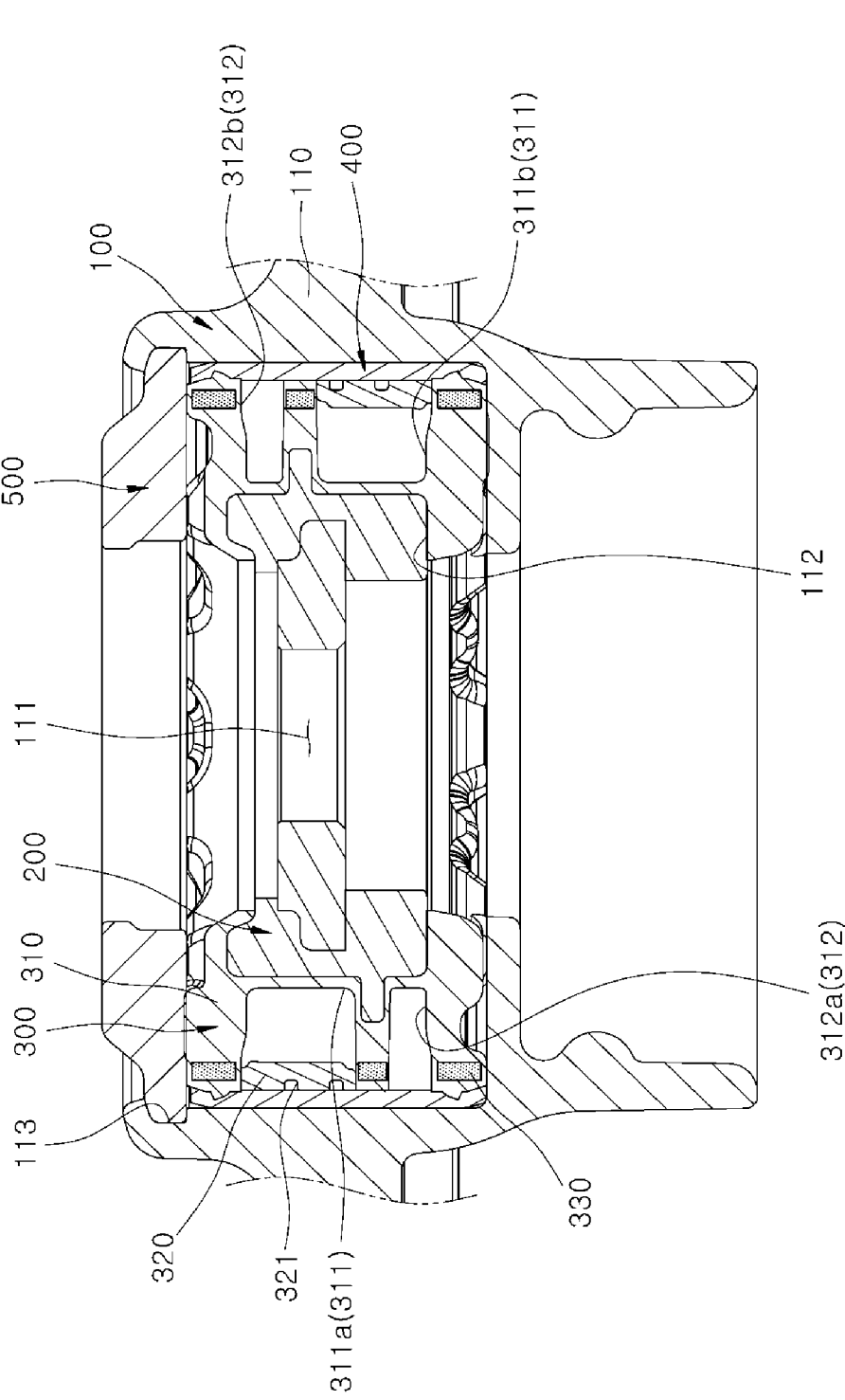
FIG. 4 is an enlarged view of the main part of FIG. 3.
Figure 6:
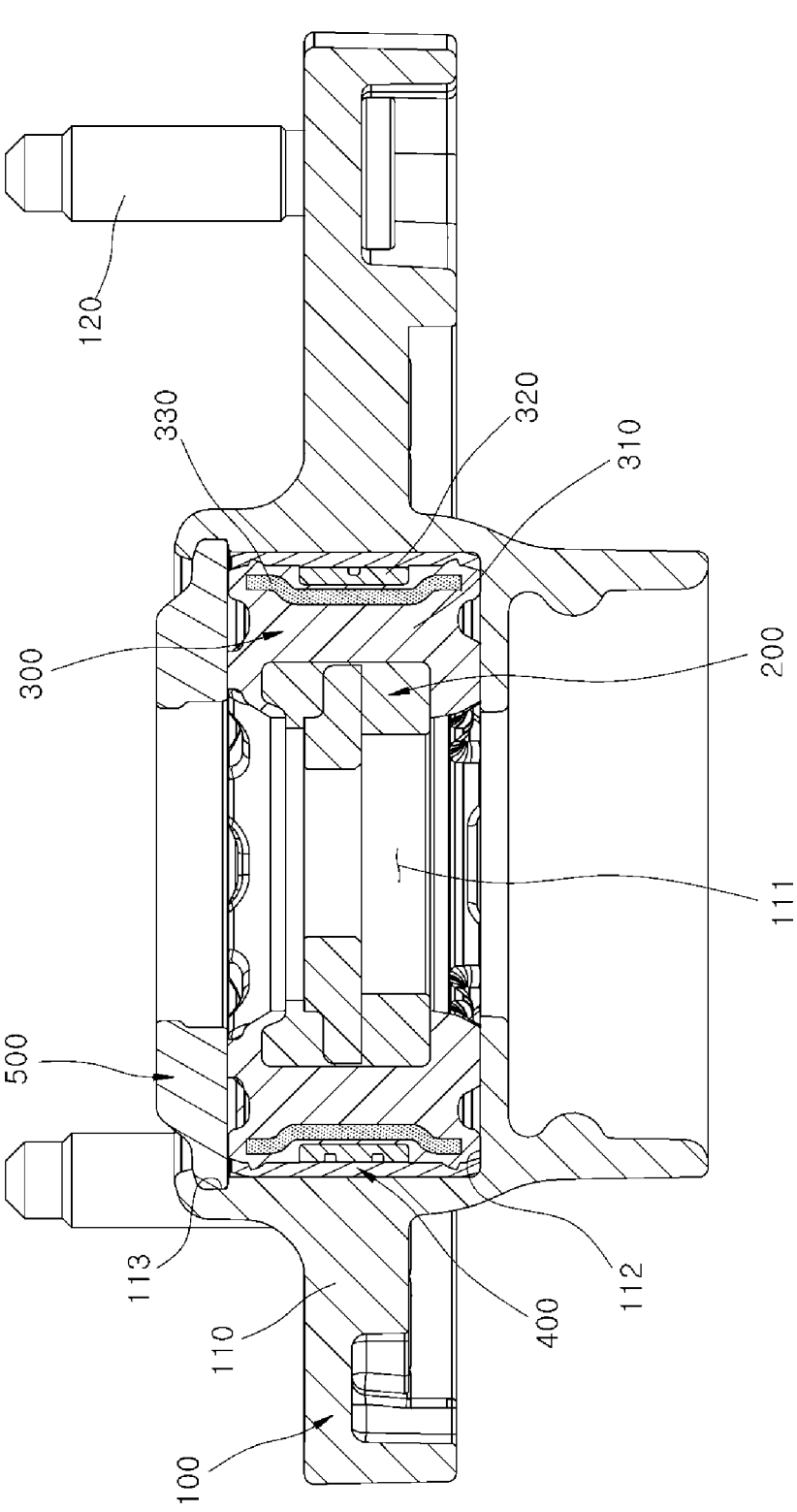
FIG. 6 is a cross-sectional view of FIG. 5.
Figure 8:
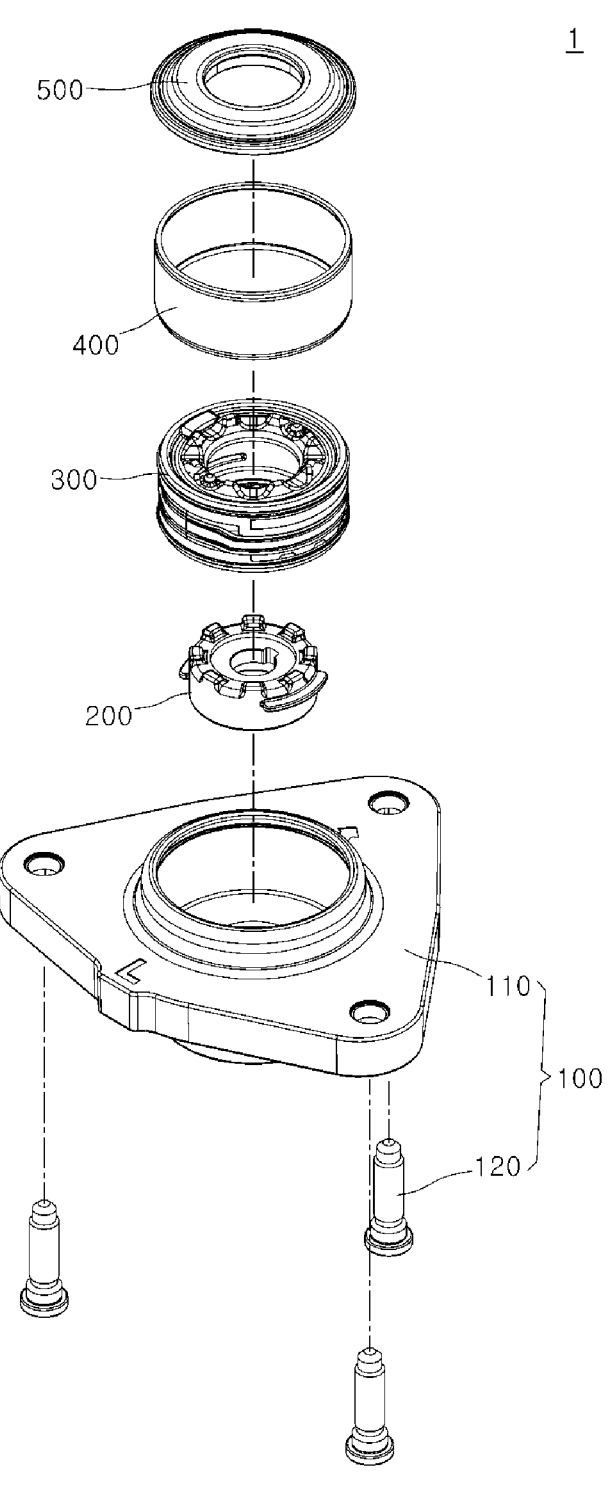
FIG. 8 is an exploded perspective view illustrating the suspension insulator according to the embodiment of the present disclosure.
Figure 9:
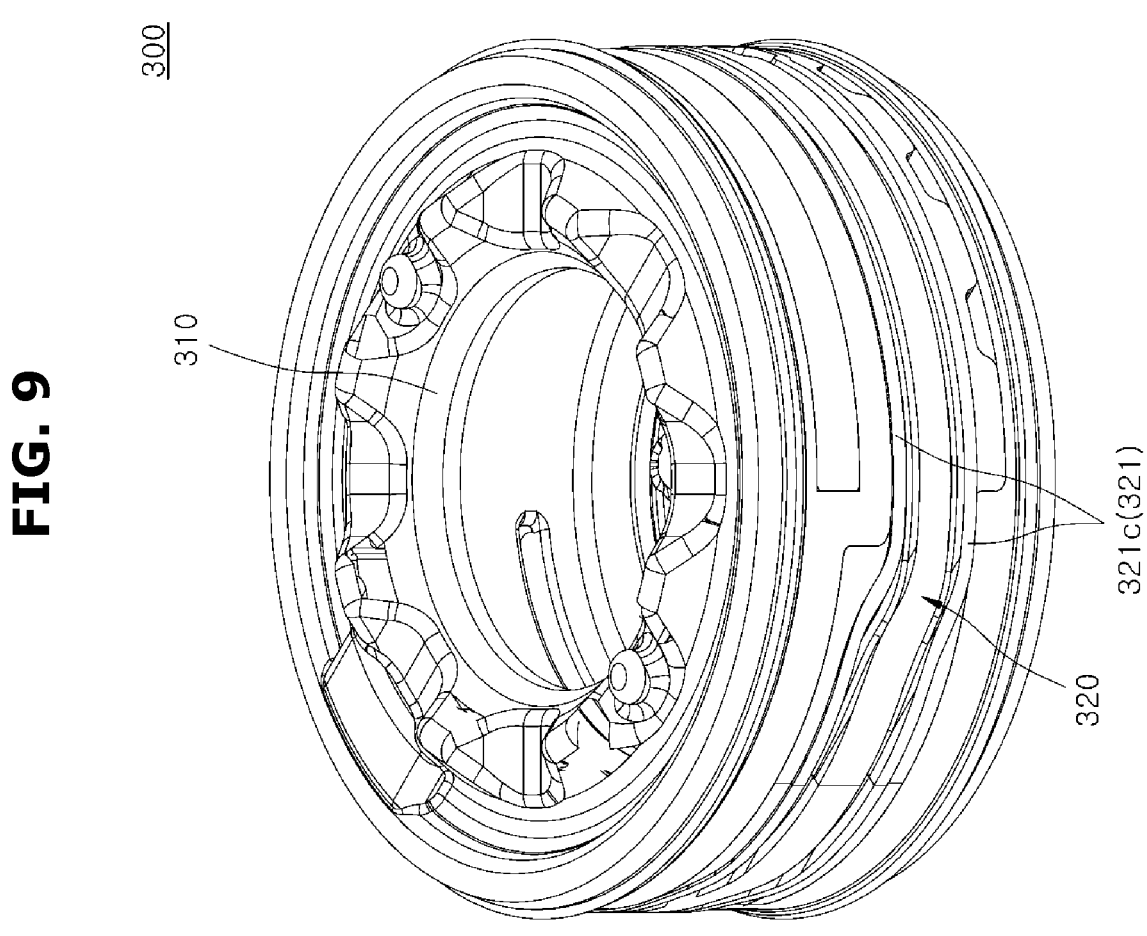
FIG. 9 is a perspective view illustrating a bushing module in the suspension insulator according to the embodiment of the present disclosure.
Figure 10:
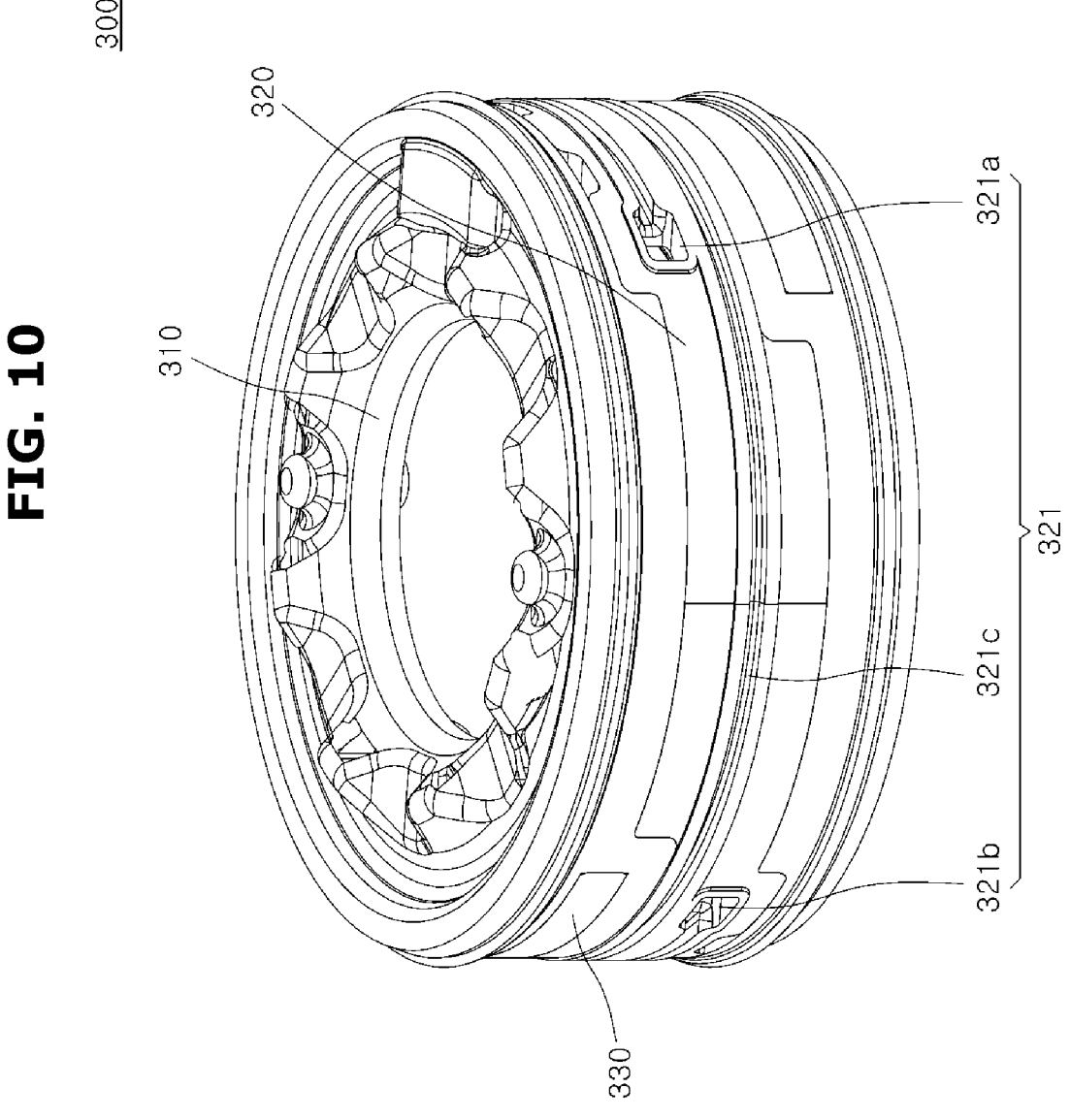
FIG. 10 is a view of FIG. 9 when viewed from another direction.
Figure 11:
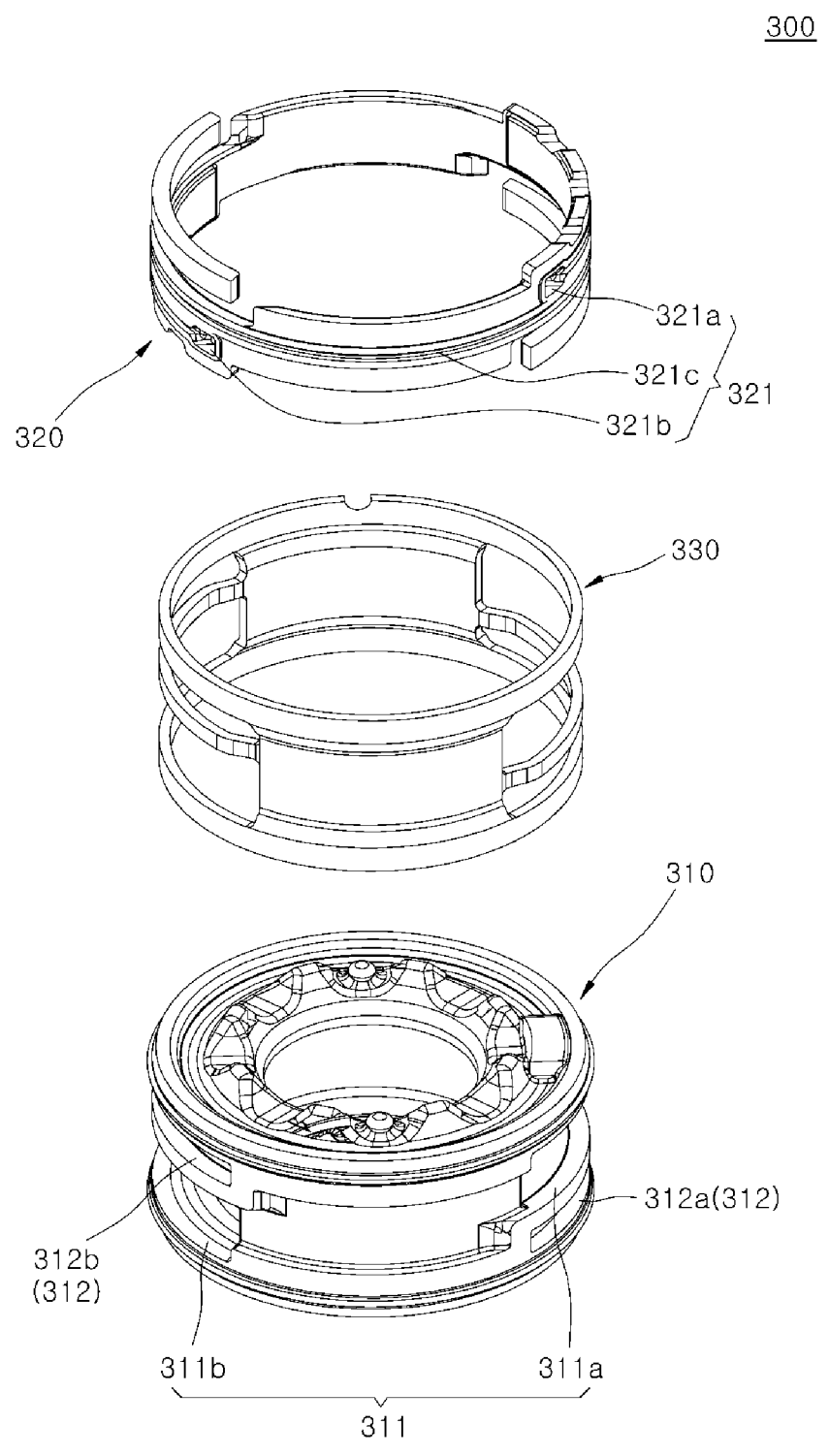
FIG. 11 is an exploded perspective view illustrating the bushing module in the suspension insulator according to the embodiment of the present disclosure.
Figure 12A:
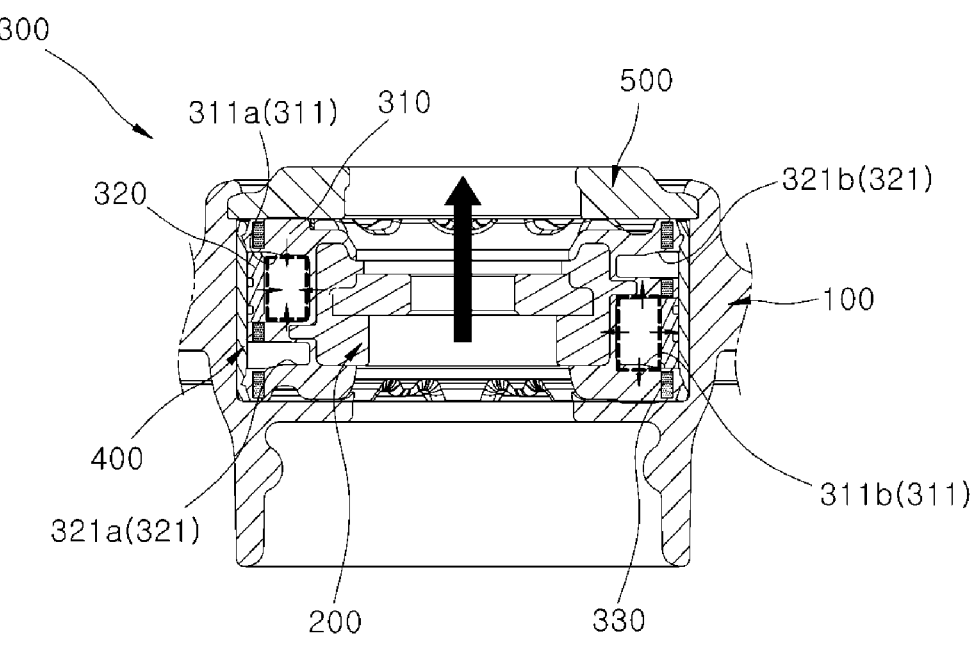
FIGS. 12A and 12B are views illustrating a principle of operation in which fluid flows along a passage part while a bushing of the bushing module is elastically deformed during movement of an inner core in the suspension insulator according to the embodiment of the present disclosure.
Figure 12B:
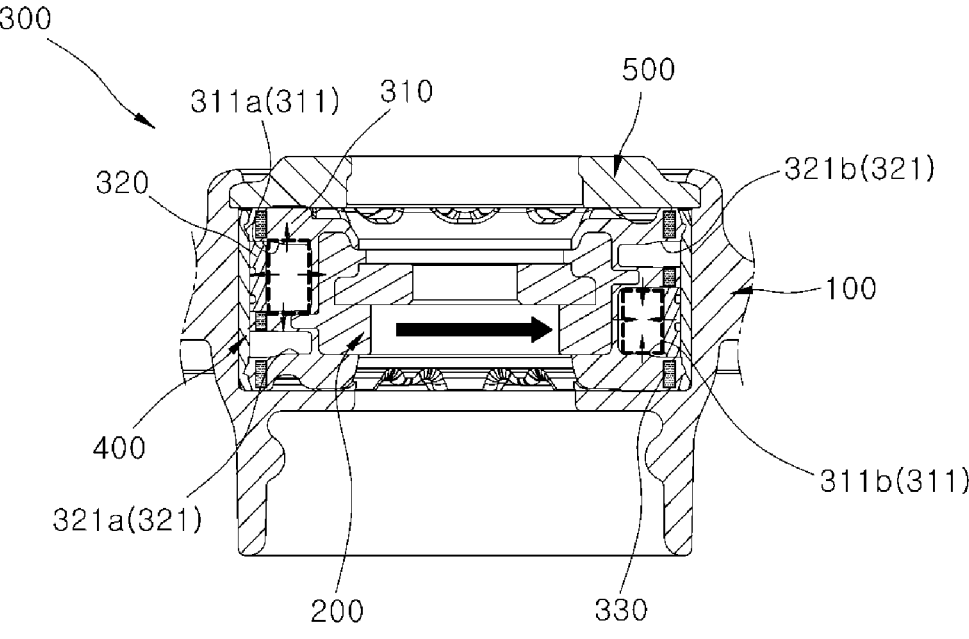

FIG. 1 is a view illustrating a suspension insulator according to an embodiment of the present disclosure. FIG. 2 is a cross-sectional perspective view taken along line A-A' of FIG. 1. FIG. 3 is a cross-sectional view of FIG. 2. FIG. 4 is an enlarged view of the main part of FIG. 3. FIG. 5 is a cross-sectional perspective view taken along line B-B' of FIG. 1. FIG. 6 is a cross-sectional view of FIG. 5. FIG. 7 is an enlarged view of the main part of FIG. 6. FIG. 8 is an exploded perspective view illustrating the suspension insulator according to the embodiment of the present disclosure. FIG. 9 is a perspective view illustrating a bushing module in the suspension insulator according to the embodiment of the present disclosure. FIG. 10 is a view of FIG. 9 when viewed from another direction. FIG. 11 is an exploded perspective view illustrating the bushing module in the suspension insulator according to the embodiment of the present disclosure. FIGS. 12A and 12B are views illustrating a principle of operation in which fluid flows along a passage part while a bushing of the bushing module is elastically deformed during movement of an inner core in the suspension insulator according to the embodiment of the present disclosure.

Referring to FIGS. 1 to 12B, the suspension insulator, which is designated by reference numeral 1, according to the embodiment of the present disclosure includes a bracket section 100, an inner core 200, a bushing module 300, an outer pipe 400, and an upper section 500.

The bracket section 100 may include a bracket 110 and a bolt 120. The bracket 110 is disposed to face a vehicle body (not shown). The bolt 120 allows the bracket 110 to be fastened to the vehicle body for fixing on the set position of the vehicle body.

The bracket 110 includes a through-hole 111 formed at the center thereof, an installation groove 112 connected to the through-hole 111, and a coupling groove 113 connected to the installation groove 112. The inner core 200 is positioned at the center of the through-hole 111. The bushing module 300 is installed in the installation groove 112. The upper section 500 is coupled to the coupling groove 113 located outside the installation groove 112.

The inner core 200 is positioned inside the bracket section 100. The inner core 200 is positioned at the center of the through-hole 111 of the bracket section 100, and is inserted into and coupled to a bushing 310 of the bushing module 300.

The bushing module 300 is coupled to the inner core 200 and has a passage part 320 for pass of fluid therethrough. As such, as the bushing module 300 has the passage part 320 for pass of fluid therethrough, vehicle performance can be improved through the elastic characteristics of the bushing 310 and the damping characteristics due to the flow of fluid, which will be described later, thereby enhancing vehicle ride comfort.

The bushing module 300 may include the bushing 310 and the passage part 320. The bushing 310 is coupled to the inner core 200, has a fluid storage part 311 for storage of fluid therein, and is made of an elastic material for elastic deformation during movement of the inner core 200. As an example, the bushing 310 may be made of a rubber material.

The bushing 310 includes the fluid storage part 311 and an elastic deformation induction part 312 (see FIG. 4). The fluid storage part 311 may include a first fluid storage portion 311a and a second fluid storage portion 311b. The first fluid storage portion 311a stores fluid therein and is connected to one end of a passage 321 of the passage part 320.

The second fluid storage portion 311b stores fluid therein, is connected to the other end of the passage 321, and is spaced apart from the first fluid storage portion 311a.

One of the first and second fluid storage portions 311a and 311b is reduced in volume when the bushing 310 is elastically deformed, for supply of fluid to the passage 321. The other of the first and second fluid storage portions 311a and 311b is expanded in volume by receiving fluid from the passage 321 when the bushing 310 is elastically deformed.

Specifically, when the vehicle body moves in a front-and-back and up-and-down direction, the inner core 200 moves in the front-and-back and up-and-down direction, namely, in the up-and-down and left-and-right direction (as illustrated in FIGS. 12A and 12B), and the bushing 310 is elastically deformed in the front-and-back and up-and-down direction, namely, in the up-and-down and left-and-right direction (as illustrated in FIGS. 12A and 12B) depending on the direction of movement of the inner core 200. In this case, the elastic deformation induction part 312 promotes the elastic deformation of the bushing 310.

When the bushing 310 is elastically deformed, one of the first and second fluid storage portions 311a and 311b is reduced in volume and the fluid, which is stored in one of the first and second fluid storage portions 311a and 311b, is supplied to the passage 321. The fluid flows along and passes through the passage 321.

The fluid flowing along the passage 321 is delivered to and then stored in the other of the first and second fluid storage portions 311a and 311b. In this case, the other of the first and second fluid storage portions 311a and 311b is expanded in volume.

As an example, when the vehicle body moves from down to up, the inner core 200 may move from down to up (as illustrated in FIG. 12A and the bushing 310 may be elastically deformed from down to up. In this case, the elastic deformation of the bushing 310 may be promoted by at least one of the first and second elastic deformation induction portions 312a and 312b of the elastic deformation induction part 312.

When the bushing 310 is elastically deformed from down to up, the first fluid storage portion 311a may be reduced in volume and the second fluid storage portion 311b may be expanded in volume. In other words, the fluid, which is stored in the first fluid storage portion 311a, may be supplied to the passage 321, may flow along the passage 321, and may then be stored in the second fluid storage portion 311b.

As another example, when the vehicle body moves from left to right, the inner core 200 may move from left to right (as illustrated in FIG. 12B and the bushing 310 may be elastically deformed from left to right. In this case, the elastic deformation of the bushing 310 may be promoted by at least one of the first and second elastic deformation induction portions 312a and 312b of the elastic deformation induction part 312.

When the bushing 310 is elastically deformed from left to right, the second fluid storage portion 311b may be reduced in volume and the first fluid storage portion 311a may be expanded in volume. In other words, the fluid, which is stored in the second fluid storage portion 311b, may be supplied to the passage 321, may flow along the passage 321, and may then be stored in the first fluid storage portion 311a.

In this way, the bushing 310 of the bushing module 300 is elastically deformed into a different shape depending on the direction of movement of the vehicle, namely, the inner core 200 during movement thereof, and the fluid storage part 311, namely, the first and second fluid storage portions 311a and 311b provided in the bushing 310 are changed for reduction or expansion in volume so that the fluid is supplied to the passage 321 of the passage part 320 and performs a damping function while flowing along the passage 321.

As a result, since the bushing module 300 has both the elastic characteristics of the bushing 310 and the damping function due to the flow of fluid, both NVH and R&H performance can be improved.

The elastic deformation induction part 312 serves to induce elastic deformation of the bushing 310. The elastic deformation induction part 312 may consist of a pair of elastic deformation induction parts that are spaced apart from each other on the bushing 310 and each shaped as a groove. The elastic deformation induction part 312 is disposed in parallel with each of the first and second fluid storage portions 311*a* and 311*b* of the fluid storage part 311.

The elastic deformation induction part 312 may include the first elastic deformation induction portion 312*a* and the second elastic deformation induction portion 312*b*. The first elastic deformation induction portion 312*a* is disposed in parallel with the first fluid storage portion 311*a*. The second elastic deformation induction portion 312*b* is disposed in parallel with the second fluid storage portion 311*b*.

The passage part 320 is coupled to the bushing 310, receives fluid from the fluid storage part 311 when the bushing 310 is elastically deformed, and has the passage 321 for passing of the supplied fluid therethrough.

The passage 321 may include a first fluid hole 321*a*, a second fluid hole 321*b*, and a passage groove 321*c*. The first fluid hole 321*a* is connected to the first fluid storage portion 311*a*, and the fluid passes through the first fluid hole 321*a*. The first fluid hole 321*a* may be connected to one end of the passage groove 321*c*, and may allow the fluid delivered from the first fluid storage portion 311*a* to be supplied to the passage groove 321*c* or the fluid delivered from the passage groove 321*c* to be supplied to the first fluid storage portion 311*a*.

The second fluid hole 321*b* is connected to the second fluid storage portion 311*b*, and the fluid passes through the second fluid hole 321*b*. The second fluid hole 321*b* may be connected to the other end of the passage groove 321*c*, and may allow the fluid delivered from the second fluid storage portion 311*b* to be supplied to the passage groove 321*c* or the fluid delivered from the passage groove 321*c* to be supplied to the second fluid storage portion 311*b*.

The passage groove 321*c* is connected to the first fluid hole 321*a* and the second fluid hole 321*b*, and the fluid passes through the passage groove 321*c*. The passage groove 321*c* has one end connected to the first fluid hole 321*a* and the other end connected to the second fluid hole 321*b*, and the fluid passes through the passage groove 321*c*.

The passage groove 321*c* has a spiral shape. This enables the fluid to flow spirally along the passage groove 321*c* from top to bottom of the passage part 320, which can effectively exhibit a damping function due to the flow of fluid.

The bushing module 300 may further include a stiffness reinforcement part 330. The stiffness reinforcement part 330 is coupled to the bushing 310 to reinforce the stiffness of the bushing 310.

The stiffness reinforcement part 330 is integrally coupled to the inside of the bushing 310, and serves to reinforce the stiffness of the bushing 310 and support the bushing 310. This enables the shape of the bushing 310 to be maintained (see FIGS. 5 to 7).

The outer pipe 400 is coupled to the bushing 310 of the bushing module 300 and surrounds the passage part 320. This enables the outer pipe 400 to prevent fluid, which flows along the passage 321 of the passage part 320, from leaking to the outside.

The upper section 500 is coupled to the bracket section 100 and covers the bushing module 300. The upper section 500 is inserted into and coupled to the coupling groove 113 of the bracket section 100, and is positioned on the top of the bushing module 300 (as illustrated in FIGS. 5 to 7 and FIGS. 12A and 12B). This can prevent foreign substances from entering the bushing module 300 from the bracket section 100.

As described above, the suspension insulator 1 according to the present disclosure can simultaneously improve NVH and R&H performance through the elastic characteristics of the bushing 310 and the damping characteristics due to flow of fluid as the bushing module 300 has the passage part 320 for pass of fluid therethrough, thereby increasing vehicle performance and enhancing vehicle ride comfort.

While the present disclosure has been described with respect to the embodiments illustrated in the drawings, it will be obvious to those skilled in the art that such embodiments are provided by way of example only. It will be understood by those skilled in the art that various modifications and other equivalent embodiments may be made without departing from the spirit and scope of the disclosure as defined in the following claims.

Therefore, the technical protection scope of the present disclosure should be defined by the following claims.

What is claimed is:

1. A suspension insulator comprising:
   a bracket section configured to be coupled to a vehicle body, the bracket section defining an installation groove and a coupling groove;
   an inner core positioned in the installation groove inside the bracket section;
   a bushing module positioned in the installation groove inside the bracket section and surrounding the inner core, the bushing module having a passage part that contains a fluid;
   an outer pipe positioned inside the bracket section and surrounding the bushing module; and
   an upper section separate from the outer pipe that is inserted into and coupled to the coupling groove of the bracket section and configured to cover the bushing module,
   wherein the bushing module defines a groove in which the inner core is retained such that the inner core is spaced apart from the bracket section and the upper section, and
   wherein:
      the bushing module comprises a bushing that surrounds the inner core and includes a fluid storage part defining a fluid storage portion in which the fluid is stored, the bushing being made of an elastic material that enables elastic deformation of the bushing and the fluid storage part during movement of the inner core,
      the passage part is arranged with respect to the bushing such that the passage is fluidly coupled to the fluid storage portion, and
      the elastic deformation of the fluid storage part causes at least a portion of the fluid in the fluid storage portion to flow into the passage.

2. The suspension insulator according to claim 1, wherein the bushing module further comprises a stiffness reinforcement part configured to reinforce a stiffness of the bushing.

3. The suspension insulator according to claim 1, wherein the bushing module comprises an elastic deformation induction part configured to induce the elastic deformation of the bushing.

4. The suspension insulator according to claim 1, wherein the fluid storage part comprises:
   a first fluid storage portion configured to store the fluid therein and connected to one end of the passage; and a second fluid storage portion configured to store the fluid therein and connected to the other end of the passage, the second fluid storage portion being spaced apart from the first fluid storage portion.

5. The suspension insulator according to claim 4, wherein: one of the first and the second fluid storage portions is reduced in volume when the bushing is elastically deformed which supplies at least a portion of the fluid therein to the other of the first and the second fluid storage portions via the passage; and the other of the first and second fluid storage portions expands in volume in response to receiving the fluid via the passage.

6. The suspension insulator according to claim 4, wherein the passage comprises:

a first fluid hole fluidly connected to the first fluid storage portion;

a second fluid hole fluidly connected to the second fluid storage portion; and a passage groove that fluidly interconnects the first fluid hole and the second fluid hole.

7. The suspension insulator according to claim 6, wherein the passage groove has a spiral shape.

\* \* \* \* \*